United States Patent [19]

Grolitzer

[11] Patent Number: 4,552,673
[45] Date of Patent: Nov. 12, 1985

[54] BLEND OF ALKYL PHENOL ETHOXYLATES AND ALKYL PHENOL GLYCOXYLATES AND THEIR USE AS SURFACTANTS

[75] Inventor: Marilyn A. Grolitzer, Hamden, Conn.

[73] Assignee: Olin Corporation, Cheshire, Conn.

[21] Appl. No.: 544,904

[22] Filed: Oct. 24, 1983

[51] Int. Cl.$^4$ .................. C11D 17/00; C09K 3/00
[52] U.S. Cl. .................. 252/8.55 D; 252/174.22; 252/351; 252/DIG. 2; 166/275
[58] Field of Search ............... 252/174.22, 351, 358, 252/DIG. 2, 8.55 D; 568/608, 618; 164/275

[56] References Cited

U.S. PATENT DOCUMENTS

| | | | |
|---|---|---|---|
| 3,514,293 | 5/1970 | Knox | 430/636 |
| 3,723,341 | 3/1973 | Raymond et al. | 8/139.1 |
| 3,725,080 | 4/1973 | Mackey | 430/636 |
| 4,240,921 | 12/1980 | Kaniecki | 252/174.22 |
| 4,371,444 | 2/1983 | McCoy et al. | 252/8.55 |

OTHER PUBLICATIONS

Olin Corporation Product Data Sheet for Poly-Tergent B-Series Surfactants.
Olin Corporation Product Brochure on Poly-Tergent Surfactants.
Olin Corporation Product Data Sheet for Glycidol Surfactant 10G.
Abstract Submitted to Society of Petroleum Engineers Programming Department in Sep. 1983 for 1984 Symposium on Enhanced Oil Recovery by M. Grolitzer and C. Fernandez.

*Primary Examiner*—Theodore Morris
*Attorney, Agent, or Firm*—William A. Simons; Thomas P. O'Day

[57] ABSTRACT

Nonionic surfactant compositions useful in forming stable emulsions with oil in saline solutions comprising a blend of:

(a) at least one alkyl phenol ethoxylate selected from the group consisting of

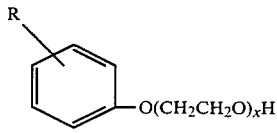

wherein R is a branched or linear alkyl group having from about 6 to about 18 carbon atoms and x is from about 4 to about 15; and (b) at least one alkyl phenol glycoxylate selected from the group consisting of

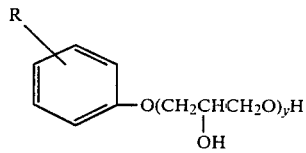

wherein R' is a branched or linear alkyl group having from about 6 to about 18 carbon atoms and y is from about 4 to about 15; and the weight ratio of (a) to (b) is from about 9:1 to about 1:2.

These surfactant compositions may be employed in enhanced oil recovery processes and other applications where good emulsification and high salinity tolerances are required such as textiles, leather, dairy, concrete grinding aids and drilling muds.

13 Claims, No Drawings

BLEND OF ALKYL PHENOL ETHOXYLATES AND ALKYL PHENOL GLYCOXYLATES AND THEIR USE AS SURFACTANTS

BACKGROUND OF THE INVENTION

1. Field of the Invention

The present invention relates to compositions comprising a blend of selected alkyl phenol ethoxylates and selected alkyl phenol glycoxylates. The present invention also relates to the use of these compositions as surfactants in enhanced oil recovery processes.

2. Brief Description of the Prior Art

Surfactants are commonly used agents employed in a wide variety of commercial processes and products. In the field of enhanced oil recovery, both anionic and nonionic surfactants are being employed. See U.S. Pat. No. 4,371,444, which issued to McCoy and Naylor on Feb. 1, 1983 and is incorporated herein by reference in its entirety.

Surfactants used in enhanced oil recovery applications are required to have certain properties. First, they should reduce the interfacial tension values between the crude oil and the aqueous drive fluid used for recovery, thereby causing good emulsification of the crude oil in the drive fluid. Second, they should stay soluble at the high temperatures sometimes experienced in the oil-bearing rock formations. Third, they should remain stable and effective even in the presence of high ionic strength materials (e.g. monovalent ions such as $Na^+$, $Cl^-$ and $OH^-$ and divalent ions such as $Ca^{++}$ and $Mg^{++}$) which may also be present during operations. Fourth, the cost of these surfactants should be low enough to justify recovery of the additional oil.

While there are surfactants that meet these requirements under certain operating conditions, there is a strong need for surfactants which are effective over wider or different ranges of operating conditions, particularly at high salinities and high temperatures.

BRIEF SUMMARY OF THE INVENTION

The present invention, therefore, is directed to a surfactant composition comprising a blend of:

(a) at least one alkyl phenol ethoxylate of the formula (I):

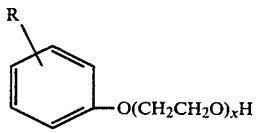

wherein R is a branched or linear alkyl having from about 6 to about 18 carbon atoms and x is from about 4 to about 15; and (b) at least one alkyl phenol glycoxylate of the formula (II):

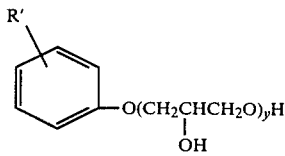

wherein R' is a branched or linear alkyl having from about 6 to about 18 carbon atoms and y is from about 4 to about 15; and the weight ratio of (a) to (b) is from about 9:1 to about 1:2.

The present invention is also directed to a process for recovering hydrocarbons from a subterranean hydrocarbon-bearing formation penetrated by at least one injection well and at least one production well, which comprises the steps of:

(1) injecting into the formation through an injection well a drive fluid comprising water having from about 0.05 to about 6.0 weight percent of the surfactant blend of (a) and (b), above;
(2) forcing the drive fluid through the formation; and
(3) recovering hydrocarbons through a production well.

DETAILED DESCRIPTION

The alkyl phenol ethoxylate compounds of formula (I), above, may be prepared by reacting the corresponding alkyl phenol with about 4 to about 15 moles of ethylene oxide. The general reactions for making these ethoxylate adducts is illustrated by the following Equation (A) wherein nonyl phenol is reacted with 6 moles of ethylene oxide to produce the desired nonyl phenol-6 mole ethoxylate adduct:

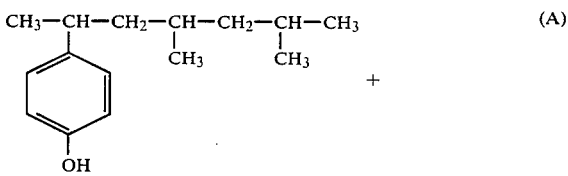

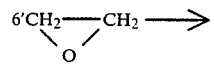

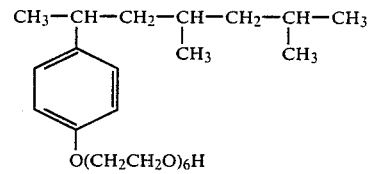

The alkyl phenol glycoxylate compounds of formula (II), above, may be prepared by reacting the corresponding alkyl phenol with about 4 to 15 moles of glycidol. The general reaction for making these glycoxylate adducts is illustrated by the following Equation (B) wherein nonyl phenol is reacted with 10 moles of glycidol to produce the desired nonyl phenol-10 mole glycoxylate adduct:

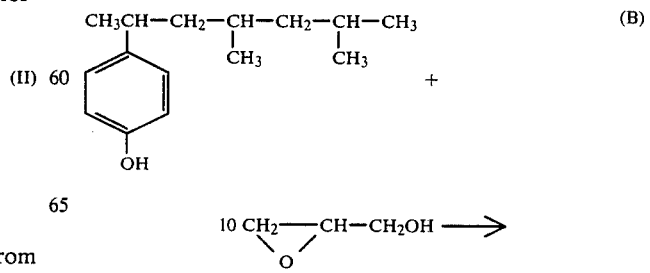

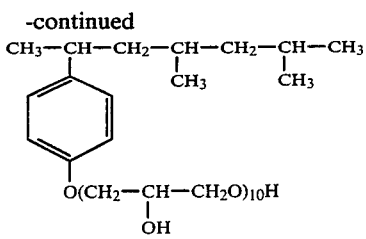

The alkyl phenol-ethoxylate adducts and alkyl phenol-glycoxylate adducts employed in the present invention may be made by any conventional reaction conditions. Advantageously and preferably, these compounds may be made according to the reactions illustrated by Equations (A) and (B) in the presence of an inert solvent and an alkaline catalyst such as potassium hydroxide. It should be understood that the present invention is not intended to be limited to any particular reaction conditions for making either adduct.

Some of the alkyl phenols (e.g. nonyl phenol) used as precursors for the present adducts are commercially available. Also, these precursors may be made by Friedel-Crafts alkylation of phenols.

The ethylene oxide (EO) and glycidol reactants are also commercially available chemicals which may be obtained from many sources. It should be understood that the number of moles of EO or glycidol reacted to each particular alkyl phenol molecule will not necessarily be the same. For instance, as shown in Equation (A), above, (where 6 moles of EO were reacted ), it does not necessarily follow that 6 moles of EO will react with each nonyl phenol molecule. Instead, it is more likely that some nonyl phenol molecules will react with only 4 or 5, or even less, moles of EO while some other nonyl phenol molecules may react with 7 or 8, or even more, moles of EO. Thus, it should be understood that the total number of EO or glycidol moles on each resulting adduct will be statistical distribution. The x and y in Formula (I) and (II), respectively, represents the average number of EO or glycidol units per adduct and that the actual number on each adduct may be less or greater than x or y.

The formula for a glycoxylate chain

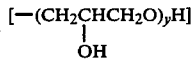

given in Formula (II) above is the one cited in literature references. However, there is some, but not definitive, analytical evidence that the actual chain structure may instead be

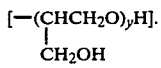

The present invention encompasses both structures within the scope of this invention.

It is preferred that in the alkyl phenol ethoxylate as defined in Formula (I) the R substituent should be from about 8 to 12 carbon atoms and x should be from about 4 to about 9. It is also preferred that in the alkyl phenol glycoxylate as defined in Formula (II) the R' substituent should be from abut 8 to 12 carbon atoms and y should be from about 6 to about 12.

The blending of the two adducts may be carried out in any conventional blending apparatus. In one preferred embodiment, the glycoxylate adducts is first diluted with water to reduce its viscosity and make it easier to handle (e.g. to pour or to transport). Then, the ethoxylate adduct is poured into this diluted glycoxylated adduct at a rate such that the two adducts are throughly mixed together. More water may be added simultaneously or later to form the desired concentration of the blend in the water.

As stated above the weight ratio of the ethoxylate to the glycoxylate should be in the range from about 9:1 to about 1:2. Preferably this ratio should be from about 3:1 to about 2:3. Most preferably this ratio should be about 1:1 when the most preferred blend-nonyl phenol-6 mole ethoxylate adduct and the nonyl phenol-10 mole glycoxylate adduct-is used.

In enhanced oil recovery applications the desired blend concentration in an aqueous drive fluid may range from about 0.05 to about 6.0% by weight. More preferably, it may range from about 0.1 to about 4.0% by weight. The optimum concentration will depend upon the particular ethoxylate adduct and glycoxylate adduct employed.

Also, in accordance with the present invention, it has been found that the blends of compounds of formulae (I) and (II), above, may be utilized as effective surfactants in enhanced oil recovery applications. For such applications, the surfactant is dissolved in a drive fluid such as water. This drive fluid is injected into a subterranean hydrocarbon-bearing formation to displace hydrocarbons in the formation toward a production well wherefrom the hydrocarbons are recovered.

As supported by the results of the specific Examples below, surfactant blends of the present invention are especially suitable for enhanced oil recovery applications because they are relatively insensitive to salinity and pH changes as well as being soluble in relatively high brine solutions and exhibiting good emulsification properties (i.e. having low interfacial tension when employed in oil vs water combinations). Also, these surfactant blends have shown the ability to mobilize crude oil in porous media while being relatively inexpensive to make.

The drive fluid compositions containing the present surfactant blend may preferably include other conventional agents employed for such applications. For example, the driving fluid may be saturated with carbon dioxide, nitrogen, natural gases or the like. Furthermore, the drive fluids of this invention may contain, if desired, a water-soluble polymeric thickening agent such as a polyacrylamide or a partially hydrolyzed polyacrylamide. Still further, the drive fluid may include an agent to prevent degradation of the thickening agent by bacterial action. Examples of such agents as well as suitable amounts of these preferred ingredients are disclosed in U.S. Pat. No. 4,371,444, mentioned above. Other conventional drive fluid ingredients may also be included for other preferred embodiments.

While the blends of the present invention were developed primarily for use in enhanced oil recovery processes, they may be useful in many other applications which require good emulsification at high salinities. Potential applications include those in industries such as dairy, leather, paint, textiles, drilling muds and concrete grinding aids.

It should also be noted that multi-substituted phenol groups such as dialkyl phenols and the like are also encompassed within the scope of the present invention and may be substituted for the monoalkyl phenol groups in either adduct.

The following Examples further illustrate the present invention. All parts and percentages employed herein are by weight unless otherwise indicated.

EXAMPLE 1

The preparation of surfactant blends of the present invention is illustrated by the following procedure.

To a 500 ml flask equipped with a mechanical stirrer a 50% by weight aqueous solution of a nonyl phenol-10 mole glycoxylate adduct[1] (150 gms total of aqueous solution) was added. Then, a nonyl phenol-6 mole ethoxylate adduct[2] (225 gms of the adduct) was added to the flask and the 1:3 blend (25% by weight glycoxylate: 75% by weight ethoxylate) was stirred with the stirrer until the blend appeared homogeneous.

[1] Glycidol Surfactant 10G sold by Olin Corporation, Stamford, Conn.
[2] POLY-TERGETN® B-200 surfactant sold by Olin Corporation, Stamford, Conn.

Various dilute aqueous solutions of this blend were then prepared by adding distilled water to the blend. The final concentrations of the surfactant blend in the aqueous solutions were 0.1%, 0.5%, 1.0% and 3.0% by weight. These dilute solutions were subjected to various testing procedures to measure the effectiveness of the surfactant. The results of that testing are given below in Tables II–VIII.

EXAMPLE 2–23

Various other sufactant blends were prepared according to the same general procedure employed in Example 1. The glycoxylated component used in each Example was initially 50% by weight water for ease of handling. These blends are given in Table 1.

TABLE 1
SURFACTANT BLENDS

| Example | Glycoxylate Adduct (wt. % of blend) | Ethoxylate Adduct (wt. % of blend) | Final Blend Concentrations (by wt.) in Aqueous Solution |
|---|---|---|---|
| 1 | nonyl phenol - 10 mole glycoxylate[1] (25%) | nonyl phenol - 6 mole ethoxylate[2] (75%) | 0.1%; 0.5%; 1.0%; 3.0% |
| 2 | nonyl phenol - 10 mole glycoxylate (40%) | nonyl phenol - 6 mole ethoxylate (60%) | 3.0% |
| 3 | nonyl phenol - 10 mole glycoxylate (50%) | nonyl phenol - 6 mole ethoxylate (50%) | 0.1%; 0.5%; 1.0%; 3.0% |
| 4 | nonyl phenol - 10 mole glycoxylate (60%) | nonylphenol - 6 mole ethoxylate (40%) | 3.0% |
| 5 | nonyl phenol - 10 mole glycoxylate (75%) | nonyl phenol - 6 mole ethoxylate (25%) | 3.0% |
| 6 | non phenol - 10 mole glycoxylate (10%) | nonyl phenol - 6 mole ethoxylate (90%) | 3.0% |
| 7 | nonyl phenol - 10 mole glycoxylate (10%) | nonyl phenol - 9 mole ethoxylate[3] (90%) | 0.1%; 0.5%; 1.0%; 3.0% |
| 8 | nonyl phenol - 10 mole glycoxylate (25%) | nonyl phenol - 9 mole ethoxylate (75%) | 0.1%; 0.5%; 1.0%; 3.0% |
| 9 | nonyl phenol - 10 mole glycoxylate (50%) | nonyl phenol - 9 mole ethoxylate (50%) | 0.1%; 0.5%; 1.0%; 3.0% |
| 10 | nonyl phenol - 10 mole glycoxylate (25%) | nonyl phenol - 4.5 mole ethoxylate[4] (75%) | 0.5%; 1.0%; 3.0% |
| 11 | nonyl phenol - 10 mole glycoxylate (50%) | nonyl phenol - 4.5 mole ethoxylate (50%) | 0.5%; 1.0%; 3.0% |
| 12 | nonyl phenol - 10 mole glycoxylate (75%) | nonyl phenol - 4.5 mole ethoxylate (25%) | 3.0% |
| 13 | nonyl phenol - 6 mole glycoxylate[5] (50%) | nonyl phenol - 6 mole ethoxylate (50%) | 3.0% |
| 14 | nonyl phenol - 6 mole glycoxylate (50%) | nonyl phenol - 9 mole ethoxylate (50%) | 3.0% |
| 15 | nonyl phenol - 6 mole glycoxylate (50%) | nonyl phenol - 15 mole ethoxylate[6] (50%) | 3.0% |
| 16 | nonyl phenol - 10 mole glycoxylate (25%) | dodecyl phenol - 8.93 mole ethoxylate[7] (75%) | 3.0% |
| 17 | nonyl phenol - 10 mole glycoxylate (50%) | dodecyl phenol - 8.93 mole ethoxylate (50%) | 3.0% |
| 18 | nonyl phenol - 6 mole glycoxylate (25%) | dodecyl phenol - 8.93 mole ethoxylate (75%) | 3.0% |
| 19 | nonyl phenol - 6 mole glycoxylate (50%) | dodecyl phenol - 8.93 mole ethoxylate (50%) | 3.0% |
| 20 | nonyl phenol - 10 mole glycoxylate (25%) | octyl phenol - 7 mole ethoxylate[8] (75%) | 3.0% |
| 21 | nonyl phenol - 10 mole glycoxylate (50%) | octyl phenol - 7 mole ethoxylate (50%) | 3.0% |
| 22 | nonyl phenol - 6 mole glycoxylate (25%) | octyl phenol - 7 mole ethoxylate (75%) | 3.0% |
| 23 | nonyl phenol - 6 mole glycoxylate (50%) | octyl phenol - 7 mole ethoxylate (50%) | 3.0% |

[1] Glycidol Surfactant 10G sold by Olin Corporation, Stamford, Connecticut.
[2] POLY-TERGENT ® B-200 surfactant sold by Olin Corporation, Stamford Connecticut.
[3] POLY-TERGENT ® B-300 Surfactant sold by Olin Corporation, Stamford, Connecticut.
[4] POLY-TERGENT ® B-150 Surfactant sold by Olin Corporation, Stamford, Connecticut.
[5] Glycidol Surfactant 6G marketed by Olin Cororation of Stamford Connecticut.
[6] POLY-TERGENT ® B-500 sold by Olin Corporation of Stamford, Connecticut.
[7] Surfactant IGEPAL ® RC 620 made by GAF Corporation of New York, New York.
[8] Surfactant IGEPAL ® CA 620 made by GAF Corporation of New York, New York.

INTERFACIAL TENSION, CLOUD POINT, SALINITY SOLUBILITY AND DRAVES WETTING TIMES CHARACTERISTICS OF SURFACTANT BLENDS

The surfactant blends of Examples 1–23 were tested for surface active properties. The results of this testing are given in Table II below.

The interfacial tensions of various surfactant concentrations in 100% water solutions vs. mineral oil were measured on a Fisher Autotensiomat Surface Tensiometer using the duNouy Ring method (ASTM Designation D 1331-56). The values given in Table II are uncorrected for the size of the ring, size of the wire used in the ring, and the densities of the two phases. For enhanced oil recovery applications, low interfacial tension (IFT) values are desirable because the lower values indicate better emulsification between the water and oil phases. Generally IFT values vs. mineral oil below about 1.0 dynes/cm are looked for in this application.

The cloud point determinations were carried out according to ASTM Designation D 2024-65. For enhanced oil recovery applications, cloud point values above about 70° C. are preferred, but not required, for wide applicability.

The salinity solubility were determined by placing 3 grams of each surfactant blend in 97 grams of the desired aqueous NaCl solution (i.e. 10%, 15% and 20% by weight). It is desirable to have salt solubilites above 10% by weight for enhanced oil recovery applications.

By analyzing the data in Table II, the following should be noted. The nonyl phenol ethoxylate adducts by themselves have relatively good emulsification properties (i.e. IFT values of 0.6 and higher), but they exhibit low cloud points and limited solubility in high ionic strength (i.e. NaCl) solutions. The nonyl phenol-10 mole glycoxylate has a high cloud point and good salt solubility, but inferior emulsification properties (i.e. high IFT's). A blend of nonyl phenol ethoxylates with this nonyl phenol-10 mole glycoxylate would be expected to possess properties intermediate between the two individual components. Unexpectedly, blends of these two classes of surfactants have IFT's which are significantly lower than either of the individual components while also having relatively high cloud points and good NaCl solubility. In particular, the blend of Example 3 has a relatively high cloud point, an interfacial tension in the millidyne range, and also very good salt solubility.

The Draves Wetting Time values were determined at 25° C. and at 0.5% by weight surfactant blend concentrations in an aqueous solution according to the method of ASTM Designation D 2281-68. This test does not have important applicability to enhanced oil recovery, but is important in determining whether or not surfactants may also be used in other applications where wetting of surfaces is an important factor.

TABLE II

| Surfactant | Interfacial Tensions (dynes/cm) at Different Surfactant Concentrations Wt. %) In 100% Water Solution | | | | Cloud Point (°C.) | Salinity Solubility (% NaCl) | Draves Wetting Time (Sec.) |
| --- | --- | --- | --- | --- | --- | --- | --- |
| | 0.1% | 0.5% | 1.0% | 3.0% | | | |
| nonyl phenol - 10 mole glycoxylate | 3.40 | 3.31 | 3.61 | 3.33 | 100° C. | soluble in saturated NaCl solution | 19 |
| nonyl phenol - 6 mole ethoxylate | — | 1.25 | 1.08 | 0.70 | — | — | — |
| Example 1 | — | 0.88 | 0.60 | 0.56 | — | — | — |
| Example 2 | — | — | — | 0.65 | — | — | — |
| Example 3 | — | 1.17 | 0.92 | 0.34 | 73° C. | slightly soluble in 20% NaCl | 2 |
| Example 4 | — | — | — | 0.55 | — | — | — |
| Example 5 | — | — | — | 1.42 | — | — | — |
| Example 6 | — | — | — | 2.47 | — | — | — |
| nonyl phenol - 9 mole ethoxylate | 2.55 | 2.14 | 2.05 | 1.95 | 56° C. | soluble in 10% NaCl | 3 |
| Example 7 | 2.51 | 2.05 | 1.91 | 1.85 | 65° C. | soluble in 15% NaCl | 3 |
| Example 8 | 2.43 | 1.90 | 1.94 | 1.83 | 78° C. | soluble in 20% NaCl | 2.5 |
| Example 9 | 2.52 | 2.11 | 2.08 | 1.90 | >100° C. | soluble in 20% NaCl | 3 |
| nonyl phenol - 4.5 mole ethoxylate | — | — | 0.20 | 0.60 | — | — | — |
| Example 10 | — | 1.23 | 0.74 | 0.25 | — | — | — |
| Example 11 | — | 1.20 | 0.82 | 0.42 | — | — | — |
| Example 12 | — | — | — | 1.00 | — | — | — |
| nonyl phenol - 6 mole glycoxylate | — | — | — | 0.99 | 100° C. | — | 2.5 |
| Example 13 | — | — | — | 0.83 | <20° C. | — | — |
| Example 14 | — | — | — | 1.10 | 67° C. | — | — |
| Example 15 | — | — | — | 1.68 | >100° C. | — | — |
| dodecyl phenol - 8.93 mole ethoxylate | — | — | — | 1.80 | 41° C. | insoluble at 15% NaCl | — |
| Example 16 | — | — | — | 1.90 | 73° C. | — | — |
| Example 17 | — | — | — | 2.12 | 100° C. | soluble in 20% NaCl | — |
| Example 18 | — | — | — | 1.39 | 49° C. | — | — |
| Example 19 | — | — | — | 1.09 | 64° C. | insoluble at 15% NaCl | 5 |
| Example 20 | — | — | — | 1.56 | 53° C. | — | — |
| Example 21 | — | — | — | 1.82 | >100° C. | — | — |
| Example 22 | — | — | — | 1.15 | 28° C. | — | — |
| Example 23 | — | — | — | 1.04 | 39° C. | — | — |

INTERFACIAL TENSION CHARACTERISTICS OF SURFACTANT BLENDS IN VARIOUS NaCl-CONTAINING AQUEOUS SOLUTIONS

The interfacial tensions of surfactant blends of Examples 3 and 7–9 (at 3% by weight concentrations) in various NaCl-containing aqueous solutions were measured vs. mineral oil by the same procedures as used to obtain the interfacial tension values given in Table II. In this case, various NaCl-containing aqueous solutions were substituted for the 100% water employed in the preceding tests. Table III shows the results of these tests. As can be seen, the relatively low interfacial tension values obtained with the blend of Example 3 indicate that this surfactant blend is very suitable for emulsifying oil in a wide variety of NaCl-containing aqueous solutions.

| Ion | ppm |
| --- | --- |
| Calcium | 2.0 |
| Magnesium | 1.0 |
| Potassium | 5.0 |
| Sodium | 402.0 |
| Sulfate | 18.0 |
| Chloride | 617.6 |

The interfacial tensions (dynes/cm) were determined

TABLE III

| Surfactant | Interfacial Tension (dynes/cm) at 3% Surfactant Conc. in Various NaCl-Containing Aqueous Solutions | | | | |
| --- | --- | --- | --- | --- | --- |
| | 0.1% NaCl | 0.3% NaCl | 1.0% NaCl | 10% NaCl | 20% NaCl |
| nonylphenol-10 mole glycoxylate | 3.86 | 3.50 | 3.42 | — | — |
| nonylphenol-9 mole ethoxylate | 1.87 | 1.73 | 1.60 | — | — |
| Example 3 | 0.66 | 0.45 | 0.70 | 0.80 | 1.12 |
| Example 7 | 1.84 | 1.72 | 1.80 | — | — |
| Example 8 | 1.75 | 1.80 | 1.75 | — | — |
| Example 9 | 1.90 | 1.90 | 1.95 | — | — |

INTERFACIAL TENSION CHARACTERISTICS OF SURFACTANT BLENDS AT VARIOUS ALKALINE PHs

The interfacial tensions of surfactant blends of Examples 3 and 7-9 (at 3% by weight concentrations) at various alkaline pH's were measured vs. mineral oil by the same procedures as used to obtain the interfacial tension values given in Table II. In this case, various alkaline aqueous solutions were substituted for the 100% water employed in those tests shown in Table II. These alkaline aqueous solutions were made by adding an aqueous NaOH solution dropwise to the surfactant-/aqueous solution until the desired pH was reached. Table IV shows the results of these tests. As can be seen, the relatively low interfacial tension values obtained with the blend of Example 3 indicate that this surfactant blend may be very suitable for emulsifying oil in a wide variety of caustic-containing aqueous solutions.

TABLE IV

| Surfactant | Interfacial Tensions (dynes/cm) with 3% Surfactant Concentrations in Various Alkaline PH's | | | |
| --- | --- | --- | --- | --- |
| | 7.6 | 9.0 | 10.5 | 12.0 |
| nonylphenol-10 mole glycoxylate | 3.60 | 3.58 | 3.33 | 3.27 |
| nonylphenol-9 mole ethoxylate | 1.95 | 1.86 | 1.86 | 1.85 |
| Example 3 | 0.67 | 0.72 | 0.98 | 0.85 |
| Example 7 | 1.83 | 1.83 | 1.90 | 1.93 |
| Example 8 | 1.92 | 1.46 | 1.61 | 1.55 |
| Example 9 | 1.95 | 1.83 | 1.99 | 2.12 |

INTERFACIAL TENSION CHARACTERISTICS VS. CRUDE OIL WITH EXAMPLE 3 BLEND

The surfactant blend of Example 3 was tested for surface active properties in various aqueous solutions vs. a napthenic Illinois crude oil using a spinning drop tensiometer [except those indicated with a "+" which are duNouy ring determinations (ASTM D971)].

The Example 3 surfactant blend was first dissolved in a simulation of a typical oil field softened fresh water source. The ion concentrations in this simulated oil field water (pH=7.6) is given below:

between the crude oil and aqueous surfactant solutions containing 0.0, 0.1, 0.5, 1.0 and 3.0% by weight of the Example 3 surfactant blend. The results of this testing are given in Table V. It can be seen from Table V that the surfactant blend reduces the interfacial tension value with increasing surfactant concentrations.

TABLE V

| Surfactant | Interfacial Tensions (dynes/cm) vs. Crude Oil At Different Surfactant Concentrations (Wt. %) | | | | |
| --- | --- | --- | --- | --- | --- |
| | 0.0% | 0.1% | 0.5% | 1.0% | 3.0% |
| Example 3 | 26.2+ | 2.1+ | 0.543 | 0.252 | 0.154 |

The effect on interfacial tension values vs. crude oil by increasing the ionic strength of an aqueous solution containing surfactant blend of Example 3 through addition of NaCl was measured. Various amounts of NaCl were added to aqueous solutions containing 3.0% by weight of Example 3. The amount of NaCl added was either 0.0%, 0.1%, 0.3%, or 1.0% by weight. The results of this testing are given in Table VI. As can be seen from the results, increasing the ionic strength of this solution resulted in a slight increase in interfacial tension values. But, this slight increase does not bring the interfacial tension values out of an acceptable range for use in enhanced oil recovery processes.

TABLE VI

| Surfactant | Interfacial Tension (dynes/cm) at 3% Surfactant Conc. in Various NaCl-Containing Aqueous Solutions | | | |
| --- | --- | --- | --- | --- |
| | 0.0% NaCl | 0.1% NaCl | 0.3% NaCl | 1.0% NaCl |
| Example 3 | 0.154 | 0.200 | 0.451 | 0.434 |

The effect on the interfacial tension values vs. crude oil by raising the surfactant solution pH to 9.0, 10.5 and 12.0 was also measured. Various amounts of an aqueous NaOH solution were added dropwise into an aqueous solution containing 3% by weight of the surfactant blend of Example 3 and the interfacial tension values were again measured. The results of this testing are given in Table VII. As can be seen, the increase in pH caused a slight increase in interfacial tension. However, this increase is not outside a range acceptable for use in commercial enhanced oil recovery applications.

TABLE VII

| | Interfacial Tensions (dynes/cm) with 3% Surfactant Concentrations in Various Alkaline PH's | | | |
|---|---|---|---|---|
| Surfactant | 7.4 | 9.0 | 10.5 | 12.0 |
| Example 3 | 0.154 | 0.225 | 0.388 | 0.434 |

SURFACTANT'S ABILITY TO MOBILIZE CRUDE OIL

In order to further determine whether the surfactant blend of Example 3 was effective for recovering oil under field test conditions (65° C.), a standard corefloding evaluation was carried out. A 2 inch thick by 6 inch in diameter fired Berea sandstone core was saturated with a simulated oil field produced water composition. The porosity of the core was measured to be 19.4% and the water permeability was measured to be 283 millidarcies. The median fluid frontal advance rate was 0.5 ft./day.

Three tests were carried out. In one test, the surfactant blend of Example 3 was used alone at a concentrations of 3.0% of the aqueous solution. The second test utilized the Example 3 bend at 3.0% concentrations along with a polyacrylamide polymer-Cyanatrol 940S made by American Cyanamid of Stamford, Conn.-at 924 parts by weight per million parts of solution. The third test used only the polymer at 875 ppm. The results of this testing are given in Table VIII, below. Oil recoveries with this surfactant blend (with and without the additional polymer) are comparable to other nonionic ethoxylated surfactants used in this application.

TABLE VIII

| Surfactant | Pore Volumes (PV) of Oil Produced | Amount of Oil Recovered (%) | Final Residual Oil Saturation (PV) |
|---|---|---|---|
| Example 3 | 0.009 | 2.5 | 0.369 |
| Example 3/polymer | 0.060 | 10.2 | 0.342 |
| No surfactant/polymer | 0.038 | 6.4 | 0.379 |

What is claimed is:

1. A surfactant composition comprising a blend of:
(a) at least one alkyl phenol ethoxylate selected from the group consisting of

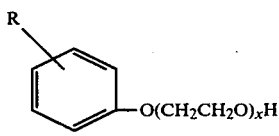

wherein R is a branched or linear alkyl having from about 6 to about 18 carbon atoms and x is from about 4 to about 15; and (b) at least one alkyl phenol glycoxylate selected from the group consisting of

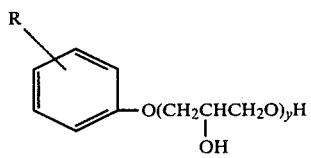

wherein R' is a branched or linear alkyl having from about 6 to about 18 carbon atoms and y is from about 4 to about 15; and the weight ratio of (a) to (b) is from about 9:1 to about 1:2.

2. The surfactant composition of claim 1 wherein (a) is at least one alkyl phenol ethoxylate selected from the group consisting of

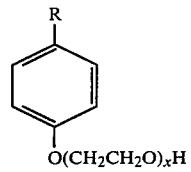

wherein R is a branched or linear alkyl having from about 8 to about 12 carbon atoms and x is from about 4 to about 9.

3. The surfactant composition of claim 1 wherein (b) is at least one alkyl phenol glycoxylate selected from the group consisting of

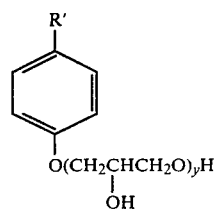

wherein R' is a branched or linear alkyl having from about 8 to 12 carbon atoms and y is from about 6 to about 12.

4. The surfactant composition of claim 1 wherein the weight ratio of (a) to (b) is from about 3:1 to about 2:3.

5. The surfactant composition of claim 1 wherein (a) is at least one alkyl phenol ethoxylate selected from the group consisting of

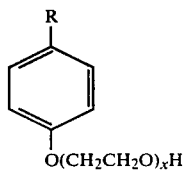

wherein R is a branched or linear alkyl having from about 8 to about 12 carbon atoms and x is from about 4 to about 9; and wherein (b) is at least one alkyl phenol glycoxylate selected from the group consisting of

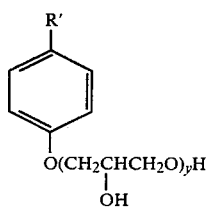

wherein R' is a branched or linear alkyl having from about 8 to about 12 carbon atoms and y is from 6 to about 12; and wherein the weight ratio of (a) to (b) is from about 3:1 to about 2:3.

6. The surfactant composition of claim 5 wherein (a) is an alkyl phenol ethoxylated of the formula

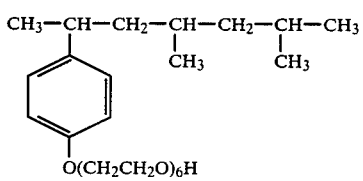

and (b) is an alkyl phenol glycoxylate of the formula

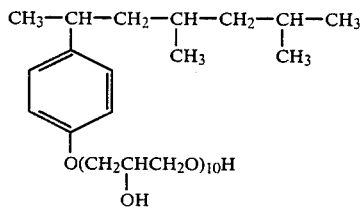

and the weight ratio of (a) to (b) is about 1:1.

7. A process for recovering hydrocarbons from a subterranean hydrocarbon-bearing formation penetrated by at least one injection well and at least one production well which comprises
 (1) injecting into the formation via an injection well a drive fluid comprising water having dissolved therein from about 0.05 to about 6.0 weight percent of a surfactant composition comprising
 (a) at least one alkyl phenol ethoxylate selected from the group consisting of

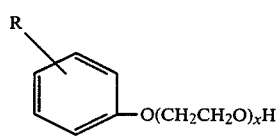

wherein R is a branched or linear alkyl having from about 6 to about 18 carbon atoms and x is from about 4 to about 15; and
 (b) at least one alkyl phenol glycoxylate selected from the group consisting of

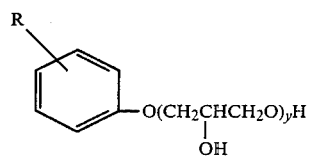

wherein R' is a branched or linear alkyl having from about 6 to about 18 carbon atoms and y is from about 4 to about 15; and the weight ratio of (a) to (b) is from about 9:1 to about 1:2;
 (2) forcing said fluid through the formation; and
 (3) recovering hydrocarbons through a production well.

8. The process of claim 7 wherein (a) is at least one alkyl phenol ethoxylate selected from the group consing of

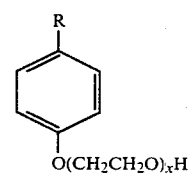

wherein R is a branched or linear alkyl having from about 8 to about 12 carbon atoms x is from about 4 to about 9; and wherein (b) is at least one alkyl phenol glycoxylate selected from the group consisting of

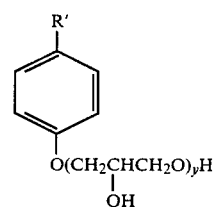

wherein R' is a branched or linear alkyl having from about 8 to about 12 carbon atoms and y is from 6 to about 12; and wherein the weight ratio of (a) to (b) is from about 3:1 to about 2:3.

9. The process of claim 8 wherein (a) is an alkyl phenol ethoxylate of the formula

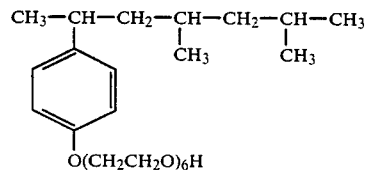

and wherein (b) is an alkyl phenol glycoxylate of the formula

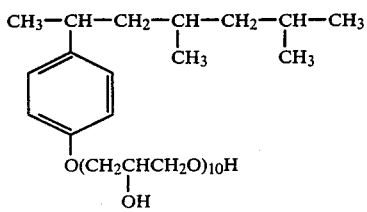

and the weight ratio of (a) to (b) is about 1:1.

10. An aqueous drive fluid composition useful for recovering hydrocarbons from a subterranean hydrocarbon-bearing formation comprising water having from about 0.05 to about 6.0 weight percent of a surfactant blend comprising:

(a) at least one alkyl phenol ethoxylate selected from the group consisting of

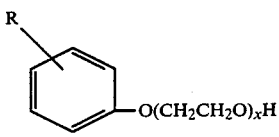

wherein R is a branched or linear alkyl having from about 6 to about 18 carbon atoms and x is from about 4 to about 15; and (b) at least one alkyl phenol glycoxylate selected from the group consisting of

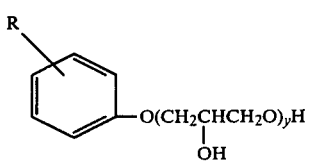

wherein R' is a branched or linear alkyl having from about 6 to about 18 carbon atoms and y is from about 4 to about 15; and the weight ratio of (a) to (b) is from about 9:1 to about 1:2.

11. The drive fluid composition of claim 10 wherein (a) is at least one alkyl phenol ethoxylate selected from the group consisting of

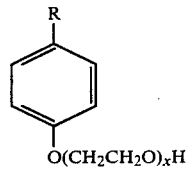

wherein R is a branched or linear alkyl having from about 8 to about 12 carbon atoms and x is from about 4 to about 9.

12. The drive fluid composition of claim 10 wherein (b) is at least one alkyl phenol glycoxylate selected from the group consisting of

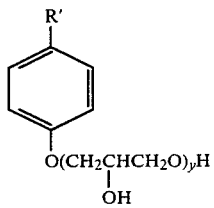

wherein R' is a branched or linear alkyl having from about 8 to 12 carbon atoms and y is from about 6 to about 12.

13. The drive fluid composition of claim 10 wherein the weight ratio of (a) to (b) is from about 3:1 to about 2:3.

* * * * *